United States Patent [19]

Shiba et al.

[11] Patent Number: 4,545,483
[45] Date of Patent: Oct. 8, 1985

[54] CASING FOR A MAGNETIC TAPE CASSETTE

[75] Inventors: Haruo Shiba; Shigetomo Takeda, both of Tokyo, Japan

[73] Assignee: TDK Corporation, Tokyo, Japan

[21] Appl. No.: 482,418

[22] Filed: Apr. 6, 1983

[30] Foreign Application Priority Data

Apr. 30, 1982 [JP] Japan .............................. 57-63625[U]

[51] Int. Cl.⁴ ........................ B65D 85/67; B65D 27/04
[52] U.S. Cl. .................................. 206/387; 206/45.34; 220/82 R; 220/DIG. 31; 229/3.5 R; 156/108; 360/132
[58] Field of Search ................... 206/387, 45.34, 45.31, 206/0.82, 0.83; 220/82 R, DIG. 31; 229/3.5 R; 156/108; 360/132

[56] References Cited

U.S. PATENT DOCUMENTS

| | | | |
|---|---|---|---|
| 2,457,998 | 1/1949 | Hayes et al. | 206/0.83 |
| 2,597,227 | 5/1952 | Colliton | 206/0.82 |
| 3,297,398 | 1/1967 | Donofrio | 156/108 |
| 3,432,380 | 3/1969 | Weber | 206/45.31 |
| 3,459,625 | 8/1969 | Heller, Jr. et al. | 229/3.5 R |
| 3,532,412 | 10/1970 | Miller | 156/108 |
| 3,587,837 | 6/1971 | Smith | 206/45.34 |
| 3,591,069 | 7/1971 | Heller, Jr. et al. | 156/108 |

Primary Examiner—William T. Dixson, Jr.
Attorney, Agent, or Firm—Oblon, Fisher, Spivak, McClelland & Maier

[57] ABSTRACT

The disclosure described a casing for a magnetic tape cassette having a transparent window which is formed by laminating a bonding layer of a plastic sheet of the same material as a casing body and a reinforcing layer of a plastic sheet of the different material from the bonding layer.

10 Claims, 3 Drawing Figures

CASING FOR A MAGNETIC TAPE CASSETTE

The present invention relates to a casing for holding a magnetic tape cassette.

A typical casing of this kind has a transparent window on at least one surface of the casing body so that a magnetic tape cassette held inside thereof can be observed from the outside. For preparation of the casing, a notched portion has been formed on at least one surface of the casing body fabricated by molding a thermoplastic material such as polypropylene and a sheet made of a transparent plastic material has been attached to the notched portion to provide a transparent window. For the casing body and the plastic sheet as a transparent window, it is necessary to obtain a desired bonding strength and to improve productivity of bonding operations. For this purpose, the plastic sheet is normally bonded to the casing body by an ultrasonic bonding method or a heat bonding method for melt-bonding the surfaces of two materials at a high temperature.

In this case, when the kind of the material used for the plastic sheet for the transparent window is different from that of the casing body, insufficient bonding of the molecules of the plastic materials is caused at the time of melt-bonding thereby resulting failure of bonding or a poor bonding strength. To avoid this, it is common to form a transparent window by using a plastic material of the same material as the casing body. However, when the transparent window is made up by a plastic sheet of a material such as polypropylene which is of the same material as the casing body, it is necessary for the sheet to have a thickness of at least about 0.3 mm to assure strength required for the window. This requirement derives a problem of inferior transparency due to nearly white-cloudy appearance thereby lowering a function as a transparent window.

It is an object of the invention to provide a casing for a magnetic tape cassette having a transparent window providing a sufficient bonding strength and a high transparency.

The foregoing and the other objects of the present invention have been attained by providing a casing for a magnetic tape cassette made of a plastic material which has a transparent window on at least one surface of the casing body wherein the transparent window is formed by laminating a bonding layer, to be bonded to the casing body, of a plastic sheet made of the same material as the casing body and a reinforcing layer of a plastic sheet made of the different material from the bonding layer.

The foregoing object, other objects as well as specific construction and functions of the casing for a magnetic tape cassette according to the present invention will become more apparent and understandable from the following detailed description thereof when read in conjunction with the accompanying drawing.

In the drawing: FIG. 1 is a schematic view of a casing for a magnetic tape cassette according to the present invention;

Figure 1:
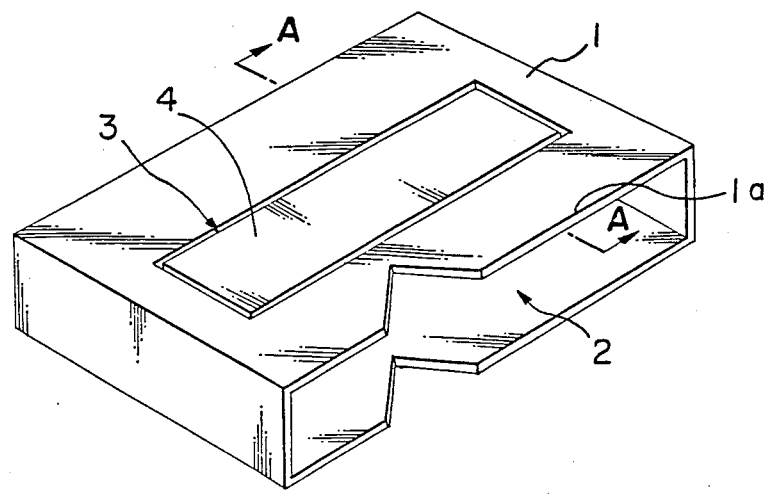
Figure 2:
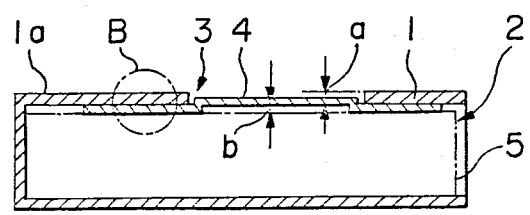
FIG. 2 is a cross sectional view taken along the line A—A in FIG. 1.

In the following, the present invention will be explained in specific details with reference to a preferred embodiment of the casing for a magnetic tape cassette as shown in the accompanying drawing.

In this embodiment, a casing body (1) formed by molding polypropylene has an opening portion (2) for receiving a magnetic tape cassette at one side surface thereof and a notched portion (3) formed in the central portion of one surface (1a) of the casing body (1), the notched portion being attached with a transparent window (4) by bonding.

Figure 3:
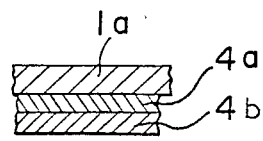
FIG. 3 is an enlarged sectional view of the part B in FIG. 2.

As shown in an enlarged sectional view of FIG. 3, the transparent window (4) is formed by laminating a transparent plastic sheet (4a) made of polypropylene which is of the same material as the casing body (1) and a transparent plastic sheet (4b) of the different material from the casing body (1) and the plastic sheet (4a), which may be made of a material such as polystyrene. In this structure, the plastic sheet (4a) is used as a bonding layer and is bonded on the reverse side of the surface (1a) of the casing body (1) by an ultrasonic bonding or a heat bonding operation. Thus, the plastic sheet (4a) made of polypropylene being the same material as the casing body (1) is bonded to the latter and accordingly, strong intermolecular bonding of the plastic materials is obtainable to provide a sufficient adhesive strength. Furthermore, since the reverse surface of plastic sheet (4a) is laminated with the plastic sheet (4b) of the different material from the plastic sheet (4a), the plastic sheet (4b) provides reinforcement to the plastic sheet (4a). It is, therefore, possible that the thickness of the plastic sheet (4a) is reduced to increase its transparency and reduction of strength caused by reducing the thickness of the plastic sheet (4a) is compensated by the plastic sheet (4b) whereby transparency and strength of the transparent window (4) are simultaneously satisfied. Improvement in both the characteristics can be attained by, for example, using a plastic sheet (4a) having a thickness of about 0.02–0.15 mm and a plastic sheet (4b) having a thickness of about 0.15–0.25 mm.

The embodiment described above has a two layer structure formed by lamination of the plastic sheets (4a) and (4b) and temperature shrinkage difference between the plastic sheets (4a) and (4b) might cause deformation such as curling of the laminated sheets, hence deformation of the transparent window (4). As an attempt to prevent such deformation of the transparent window (4), it can be considered to attach an additional layer of the same material as the plastic sheet (4a), to the opposite surface of the plastic sheet (4b) with respect to the surface to which the plastic sheet (4a) is laminated.

With this three layer structure, temperature shrinkage difference caused between both the laminated surfaces of the plastic sheet (4b) as a reinforcing layer are balanced to prevent the transparent window from the deformation such as curling.

In this embodiment, the inner surface of the transparent window (4) is outwardly recessed to have a step (b) so that a magnetic tape cassete (5) is not in slide-contact with the inner surface of the transparent window (4) when the cassette (5) is inserted into or is drawn from the opening portion (2) whereby damage of the inner surface of the transparent window (4) caused by insertion and withdrawal of the magnetic tape cassette is provided, hence decrease of transparency is prevented. Furthermore, the outer surface of the transparent window (4) is lower than the outer surface of the casing body (1) by a step (a) and accordingly, the outer surface of the transparent window (4) is not damaged even though the casings are placed one upon another.

As described above, a plastic casing for a magnetic tape cassette of the present invention has a transparent window on at least one surface of the casing body, and the transparent window is formed by laminating a bonding layer, to be bonded to the casing body, of a transparent plastic sheet of the same material as the casing body and a reinforcing layer of a plastic sheet of the different material from the bounding layer with the result that a casing for a magnetic-tape cassette having a transparent window providing a sufficient strength and a high transparency can be obtained.

We claim:

1. A casing for a magnetic tape cassette made of a plastic material having a transparent window on at least one surface of the casing body characterized in that said transparent window is formed by laminating a bonding layer, to be bonded to said casing body, of a plastic sheet made of the same material as said casing body and a reinforcing layer of a plastic sheet made of the different material from said bonding layer.

2. A casing for a magnetic tape cassette according to claim 1 wherein said transparent window has a three layer structure formed by laminating a plastic sheet of the same material as said bonding layer on the surface opposite the surface of the reinforcing layer to which said bonding layer is bonded.

3. A casing for a magnetic tape cassette according to claim 1 wherein said transparent window is bonded to said casing body by an ultrasonic bonding or a heat bonding method.

4. A casing for a magnetic tape cassette according to claim 1 wherein said casing body and said bonding layer are respectively made of polypropylene and said reinforcing layer is made of polystyrene.

5. A casing for a magnetic tape cassette according to claim 1 wherein the outer surface of said transparent window is lower than the outer surface of said casing body.

6. A casing for a magnetic tape cassette according to claim 1 wherein the inner surface constituting a window part of said transparent window is recessed to be lower than the inner surface of the peripheral part of said reinforcing plastic sheet.

7. A casing for a magnetic tape cassette according to claim 2 wherein said transparent window is bonded to said casing body by an ultrasonic bonding or a heat bonding method.

8. A casing for a magnetic tape cassette according to claim 2 wherein said casing body and said bonding layer are respectively made of polypropylene and said reinforcing layer is made of polystyrene.

9. A casing for a magnetic tape cassette according to claim 2 wherein the outer surface of said transparent window is lower than the outer surface of said casing body.

10. A casing for a magnetic tape cassette according to claim 2 wherein the inner surface constituting a window part of said transparent window is recessed to be lower than the inner surface of the peripheral part of said reinforcing plastic sheet.

* * * * *